Aug. 6, 1935.  W. W. BARTON ET AL  2,010,745
CULTIVATOR ATTACHMENT
Original Filed Dec. 26, 1933   2 Sheets—Sheet 1
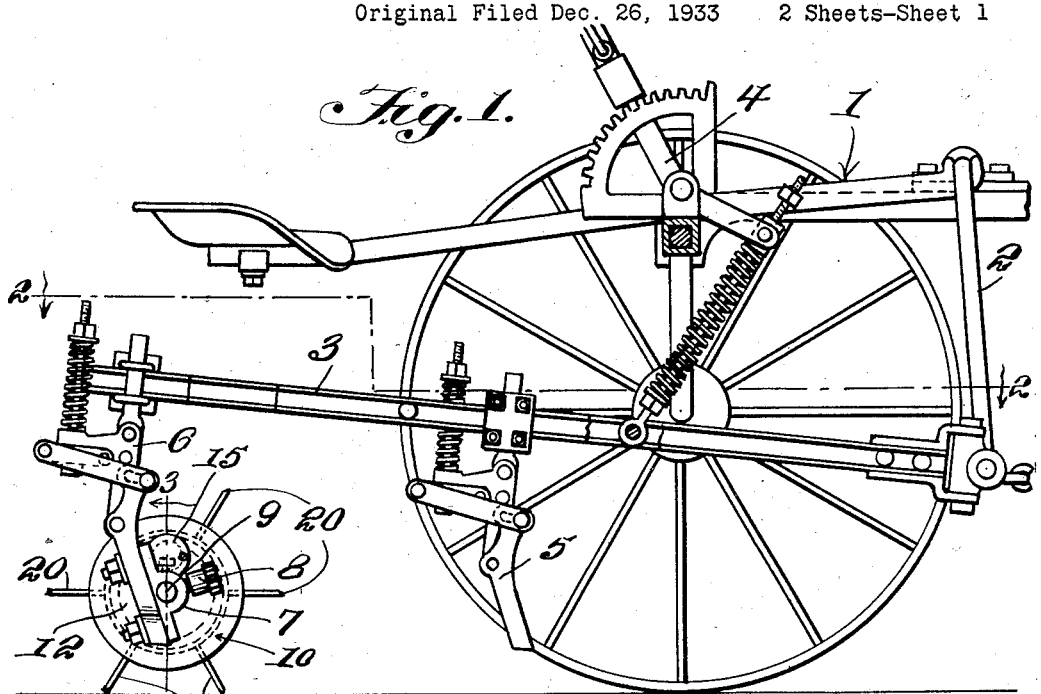
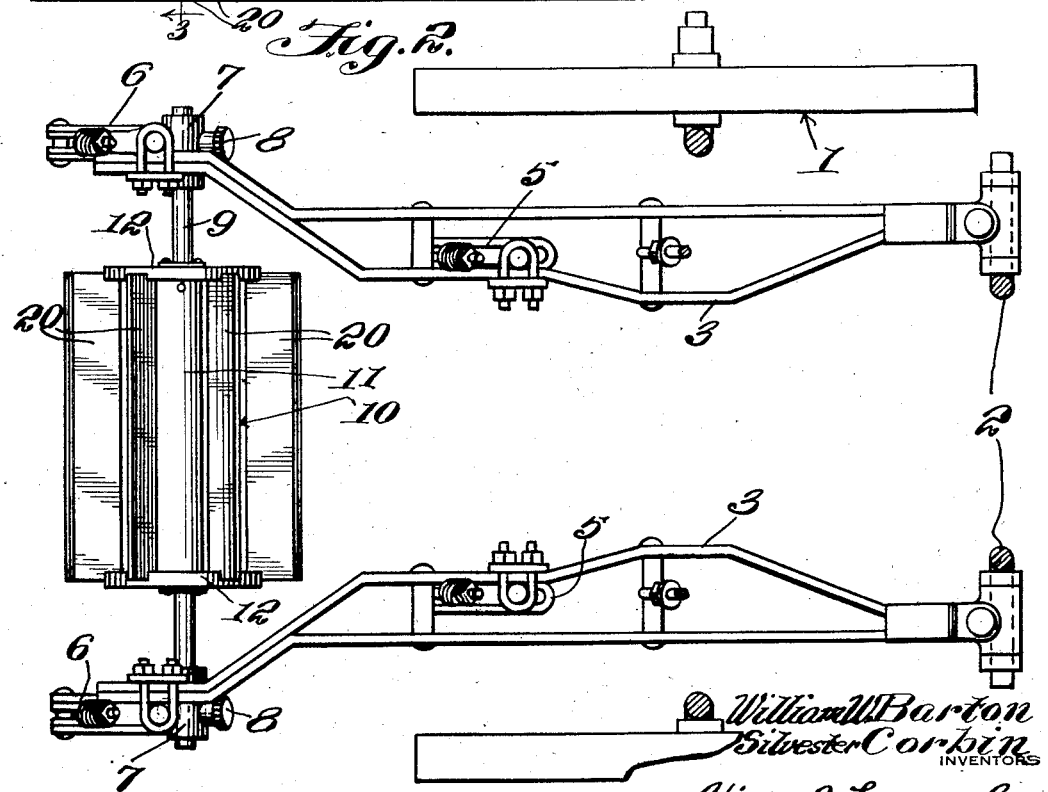
William W. Barton
Silvester Corbin
INVENTORS
BY Victor J. Evans & Co.
ATTORNEY
WITNESS: J. T. L. Wright Aug. 6, 1935.  W. W. BARTON ET AL  2,010,745
CULTIVATOR ATTACHMENT
Original Filed Dec. 26, 1933   2 Sheets-Sheet 2
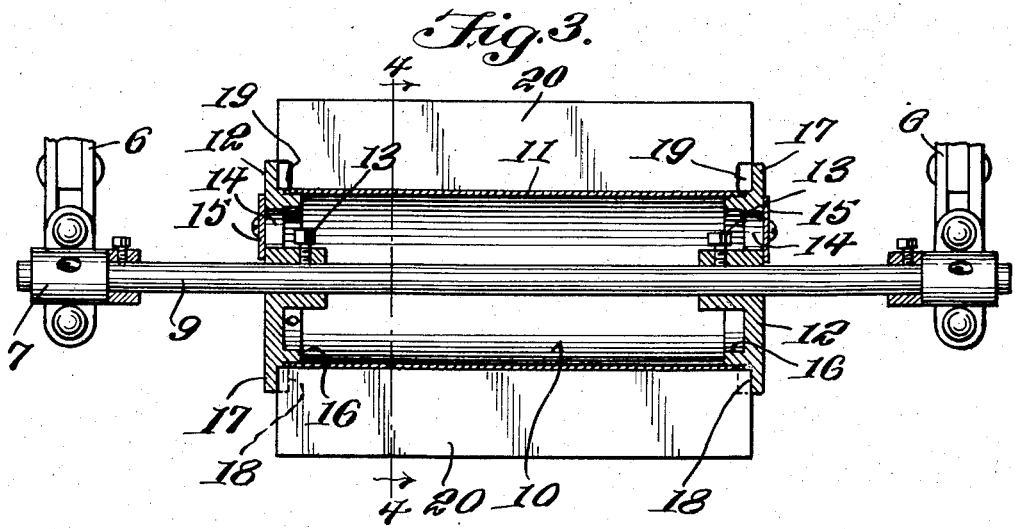
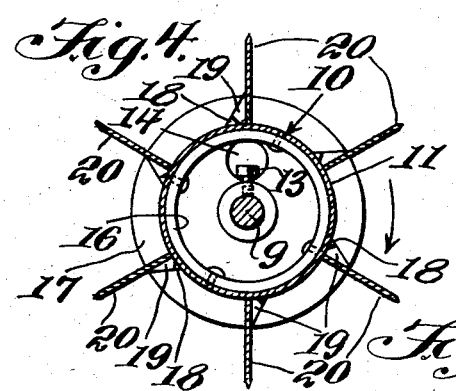
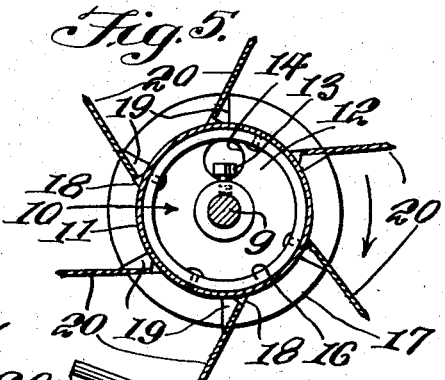
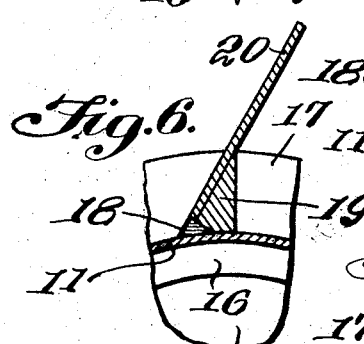
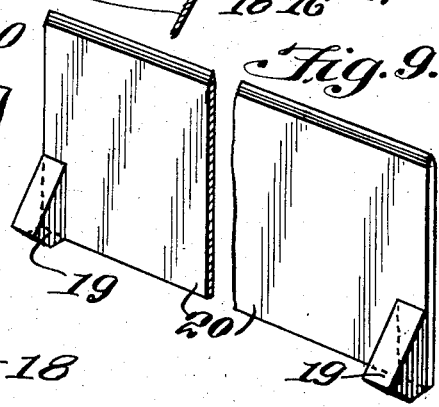

Patented Aug. 6, 1935

2,010,745

UNITED STATES PATENT OFFICE 2,010,745

CULTIVATOR ATTACHMENT

William W. Barton and Silvester Corbin,
Hatch, N. Mex.

Application December 26, 1933, Serial No. 704,044
Renewed March 27, 1935

3 Claims. (Cl. 97—179)

This invention relates to attachments for cultivators and has for the primary object, the provision of a device which may be easily and quickly installed to a conventional type of straddle row cultivator for converting the latter into a device especially adapted for cutting stalks of cotton and similar growths so that such growths may be easily turned under the ground when preparing the latter for planting.

With these and other objects in view this invention consists in certain novel features of construction, combination and arrangement of parts to be hereinafter more fully described and claimed.

For a complete understanding of our invention, reference is to be had to the following description and accompanying drawings, in which Figure 1 is a side elevation partly in section of a conventional type of cultivator with one of the ground wheels removed and having an attachment applied thereto and constructed in accordance with our invention.

Figure 2 is a sectional view taken on the line 2—2 of Figure 1.

Figure 3 is a sectional view taken on the line 3—3 of Figure 1.

Figure 4 is a transverse sectional view taken on the line 4—4 of Figure 3.

Figure 5 is a sectional view showing the blades adjusted at a different angle with respect to the drum than that shown in Figure 4.

Figure 6 is a fragmentary sectional view showing the connection of the blade to the drum and occupying an angle with respect to the drum as that shown in Figure 5.

Figure 7 is a similar view to Figure 6 showing the blade adjusted at an angle with respect to the drum as that shown in Figure 4.

Figure 8 is a detail sectional view showing one of the grooves of the drum receiving one of the end blocks of the blade.

Figure 9 is a perspective view illustrating one of the blades.

Referring in detail to the drawings, the numeral 1 indicates a conventional type of straddle row cultivator having the usual supporting beam 2 to which the frames 3 are pivoted or hinged. The frames extend rearwardly between the ground wheels and may be adjusted upwardly and downwardly through the adjusting means 4. The frames 3 carry the usual front and rear pairs of foot pieces 5 and 6, the latter being of a well known yieldable construction in which each foot piece is slotted so that a cultivator blade or shoe may be detachably secured thereto. When employing our invention in connection with a cultivator of the character heretofore described, the blades are removed and the rear pair of foot pieces have removably secured thereto bearings 7 provided with lubricating cups 8 and the bearings rotatably support the ends of a shaft 9 to which is secured a drum 10 arranged for operation between the frames 3. The drum consists of a cylinder 11 and heads 12. The latter are adjustably secured to the shaft 9 by set bolts 13 arranged upon the interior of the cylinder, as shown in Figure 3. Hand-holds 14 are provided in the heads 12 to permit a person to readily adjust the set bolts. The hand-holds are normally closed by removable covers 15. The heads 12 are provided with annular seats 16 received within the ends of the cylinder and said heads are provided with annular flanges 17 arranged at right angles to the seats 16. The flanges 17 have formed therein substantially triangular shaped grooves 18 and the grooves of one flange align with the grooves of the other flange. The grooves receive substantially triangular shaped blocks 19 formed on blades 20. The blocks fitting within the grooves and the heads adjusted to abut the ends of the blades will firmly support said blades at a desired inclination with respect to the periphery of the cylinder. The blades may be adjusted to extend radially from the cylinder, as shown in Figure 4, or at an angle to said cylinder, as shown in Figure 5. This adjustment is obtained by reversing the ends of the blades with respect to the heads.

During the operation of the device the blades contact with the ground and any growth engaged by the blades will be severed so that said growth when the ground is tilled may be turned therein. When using the cultivator with the attachment applied thereto the front pair of foot pieces act as mediums for straightening any stalks of growth that may be growing outwardly from the row so as to bring such stalks within the path of the cutting blades.

While we have shown and described the preferred embodiment of our invention, it will be understood that minor changes in construction, combination and arrangement of parts may be made without departing from the spirit and scope of our invention, as claimed.

Having described the invention, we claim:

1. An attachment for cultivators comprising a shaft journaled to and arranged transversely of the cultivator, a drum secured to said shaft, blocks removably secured to the periphery of the drum and capable of adjustment to extend at various angles with respect to the periphery of the drum and cutting blades carried by the blocks.

2. A cultivator attachment comprising a shaft journaled to a cultivator, heads adjustably secured to said shaft, a cylinder secured to said heads inwardly of the peripheries thereof, cutter blades engaging the cylinder, and means for adjustably securing the blades to the heads to permit the inclination of said blades with respect to the cylinder to be varied.

3. A cultivator attachment including a supporting shaft, heads adjustably secured to said shaft, a cylinder supported by said heads, flanges on said heads and projecting beyond the periphery of the cylinder and having substantially triangular shaped grooves, blades received between said flanges, and blocks on said blades to fit the grooves whereby the inclination of said blades may be varied with respect to the periphery of the cylinder.

WILLIAM W. BARTON.
SILVESTER CORBIN.